United States Patent [19]

Chang

[11] Patent Number: 4,575,180

[45] Date of Patent: Mar. 11, 1986

[54] INTRAWAVEGUIDE FIBER OPTIC BEAMSPLITTER/COUPLER

[76] Inventor: David B. Chang, 14212 Livingston St., Tustin, Calif. 92680

[21] Appl. No.: 523,325

[22] Filed: Aug. 15, 1983

[51] Int. Cl.[4] .............................................. G02B 5/172
[52] U.S. Cl. ................................. 350/96.15; 156/643; 350/96.16; 350/320
[58] Field of Search ............... 350/96.15, 96.16, 96.19, 350/96.29, 96.30, 320; 156/643

[56] References Cited

U.S. PATENT DOCUMENTS

| | | | |
|---|---|---|---|
| 3,814,498 | 6/1974 | Tomlinson, III et al. | 350/96.19 |
| 3,879,606 | 4/1975 | Bean | 250/227 |
| 3,968,564 | 7/1976 | Springthorpe | 29/580 |
| 4,015,893 | 4/1977 | Sugano et al. | 350/96.12 |
| 4,081,672 | 3/1978 | Caspers et al. | 250/227 |
| 4,165,496 | 8/1979 | Di Domenico, Jr. et al. | 331/94.55 |
| 4,173,390 | 11/1979 | Käch | 350/96.16 |
| 4,195,907 | 4/1980 | Zamja et al. | 350/96.15 X |
| 4,296,995 | 10/1981 | Bickel | 350/96.15 |
| 4,314,740 | 2/1982 | Bickel | 350/96.15 |
| 4,346,961 | 8/1982 | Porter | 350/96.16 |
| 4,351,585 | 9/1982 | Winzer et al. | 350/96.15 |
| 4,390,391 | 6/1983 | Fujita et al. | 156/628 |

FOREIGN PATENT DOCUMENTS

| | | | |
|---|---|---|---|
| 52-35806 | 3/1977 | Japan. | |
| 56-161504 | 12/1981 | Japan | 350/96.15 |
| 58-34408 | 8/1981 | Japan. | |

OTHER PUBLICATIONS

Kawachi et al, "Fabrication of Single-Polarisation Single-Mode-Fibre Coupler," *Electronics Letters*, Oct. 28, 1982, vol. 18, No. 22, pp. 962-964.

Villarruel et al, "Polarisation Preserving Single-Mode-Fibre Coupler," *Electronics Letters*, Jan. 6, 1983, vol. 19, No. 1, pp. 17 and 18.

Parriaux et al, "Distributed Coupling on Polished Single-Mode Optical Fibers," *Applied Optics*, vol. 20, No. 14, Jul. 15, 1981, pp. 2420-2423.

Personick, "Review of Fundamentals of Optical Fiber Systems," *IEEE Journal on Selected Areas in Communications*, vol. SAC-1, No. 3, Apr., 1983, pp. 373-380.

Winzer et al, "Single-Mode and Multimode All-Fiber Directional Couplers for WDM," *Applied Optics*, vol. 20, No. 18, Sep. 15, 1981, pp. 3128-3135.

Schöner et al, "Novel Method for Making Single-Mode Optical Fibre Directional Couplers," *Electronics Letters*, Jun. 24, 1982, vol. 18, No. 13, pp. 566-568.

Chen et al, IEEE Journal of Quantum Electronics Vol. QE-18, No.7, July, 1982, pp. 1072-1077.

Ohmachi et al, Applied Physics Letters, Vol. 20, No. 12, June 15, 1972, pp. 506-508.

*Primary Examiner*—John Lee
*Attorney, Agent, or Firm*—Banner, Birch, McKie & Beckett

[57] ABSTRACT

An intrawaveguide fiber optic beamsplitter/coupler and method is enclosed and claimed in which an oriented slot is formed in an intact optical fiber whereby the internal slot functions to divide and direct light along desired paths.

29 Claims, 8 Drawing Figures

INTRAWAVEGUIDE FIBER OPTIC BEAMSPLITTER/COUPLER

BACKGROUND OF THE INVENTION

This invention relates to fiber optic beamsplitters and couplers for dividing, combining, and directing light beams along desired pathways.

The use of optical fiber beamsplitter/couplers for directing light along a desired pathway is well known. Various examples of the methods employed to create a network of light pathways have been disclosed, for example, in U.S. Pat. Nos. 4,314,740, 3,968,564, 4,346,961, 4,351,585 and 4,296,995. In each of these patents, however, as well as in other work in this field, at least two optical fibers have been required which are separated by a coupling region, or space, between the fibers and/or the shapes of the fibers must be modified significantly. These prior art arrangements require precise alignment of the fiber ends, which in some cases may be separated by less than a wavelength of light or they require careful juxtaposition of fibers from which portions of the cladding have been accurately removed.

Precise alignment of the optical fiber ends and/or lengths is important also to avoiding polarization shifts. In many applications and uses of optical fibers, it is important to maintain linear polarization of the light. The change of state of polarization could appear as fringe shifts and introduce large noise amplitudes into the readout of, for example, a fiber optic interferometric sensor. To reduce the contribution to the noise amplitude caused by a change of the state of polarization, fiber optic beamsplitters can be made using slanted end, polarization-maintaining fibers. By the use of polarization-maintaining fibers, the contribution of polarization mixing within the fiber is reduced. Precise alignment of the fiber ends and/or lengths can maintain polarization through the coupling region separating two optical fibers.

The precise alignment required of the ends and/or lengths of optical fibers in the coupling region requires very accurate and very time-consuming procedures. The invention described and claimed herein eliminates the problem of aligning two optical fibers in order to transmit light by using an internal slot formed inside an intact optical fiber. This internal slot, instead of the external gaps between fibers, is used to accomplish the redirection and transmission of light along desired pathways.

SUMMARY OF THE INVENTION

The invention described and claimed herein relates to an optical fiber beamsplitter/coupler and a method of making an optical waveguide beamsplitter/coupler. The method includes the steps of forming an oriented slot in an intact optical waveguide and using the slot to divide and/or direct light beams along desired paths. In the preferred form, micromachining techniques are used to form the oriented slot in the waveguide. The micromachining may be done by either a physical process or by a chemical process and may include, without limitation, photon irradiation, reactive particle beam etching, lithography or etching. The "slot" could also be created by doping or ion- or radiation-induced damage or alteration of a localized region of the optical fiber. With either method of forming the slot, that is, either micromaching or doping, the redirection and transmission of light along the optical fiber is achieved by a change in the real and/or imaginary portions of the index of refraction in the light path.

When light in the fiber encounters the slot, a portion is reflected and a portion is transmitted, with the direction of the reflected and transmitted portions depending on the angle the slot makes with the fiber axis. For some angles, the transmitted light in the slot is in the form of an evanescent wave, whereas at other angles the transmitted light may be in the form of a travelling wave. The amount of light transmitted through the slot can be determined by the slot width and orientation angle.

It is also possible, according to the invention, to coat an internal slot inside the intact fiber, with a thin conducting film in order to make the slot angle less critical.

The beamsplitter/coupler of the present invention may be selectively coupled into an array of linear waveguides. The linear waveguides in the preferred embodiment comprise a first and second layer of material having an index of refraction and a third layer of material between the first and second layers which has an index of refraction higher than the index of refraction of the material of the first and second layers. A plurality of intact linear waveguides is formed in the layers. A plurality of light-directing slots is formed in each of the intact linear waveguides whereby the waveguides are selectively coupled to create a circuit. The linear waveguides may be of varying widths.

DESCRIPTION OF THE PREFERRED EMBODIMENT

This invention provides an optical fiber beamsplitter and coupler, a practical means of making an optical fiber beamsplitter and coupler, and a method for fabricating complicated networks of coupled optical waveguides. The invention is particularly useful for making polarization-maintaining beamsplitters and couplers, but it may also be used for non-polarization-maintaining beamsplitters and couplers.

Figure 1:
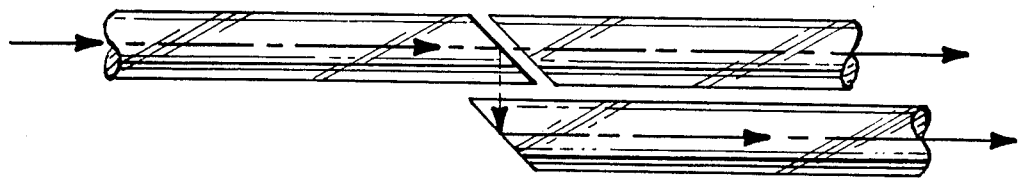
FIG. 1 illustrates a prior art method of directing light from one optical fiber to another.

In most applications of fiber optic beamsplitters and couplers, and particularly in interferometric sensors, it is important to maintain linear polarization. If polarization is not maintained, fringe shifts and large noise amplitudes in the readouts may result. Changes in polarization can occur both in the optical fibers transmitting light and in the beamsplitters and couplers which join the fibers. As shown in FIG. 1, slanted end, polarization-maintaining fibers have been used in order to maintain linear polarization. By the use of polarization-maintaining fibers, the contribution of the fiber to changes in polarization is reduced. By careful positioning of the slanted ends of the fibers, as shown in FIG. 1, linear polarization can be maintained through the coupling region, or space, between the fibers. This method, however, requires very accurate and time-consuming alignments of the fiber ends. The present invention overcomes these problems by using a single intact fiber to direct light along the desired pathway rather than the two fibers whose ends must be carefully positioned as has been done in the prior art.

It is also known to carefully strip away the cladding along portions of two fibers and to then place the fibers in juxtaposition. This also requires very careful positioning in addition to very careful removal of the cladding.

Figure 2:
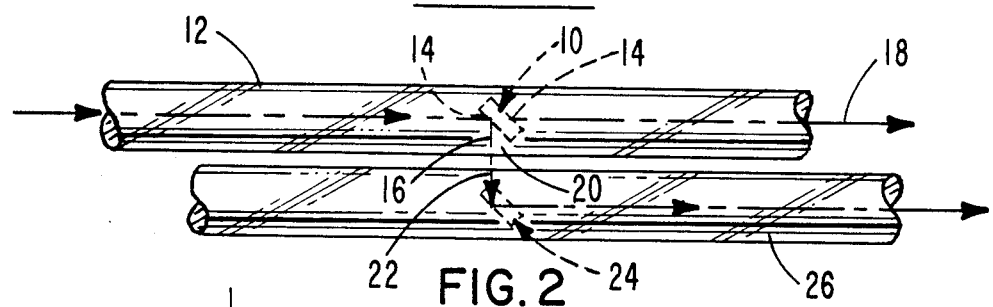
FIG. 2 is a schematic illustration of an intact optical fiber having an internal slot to direct light.
Figure 3:
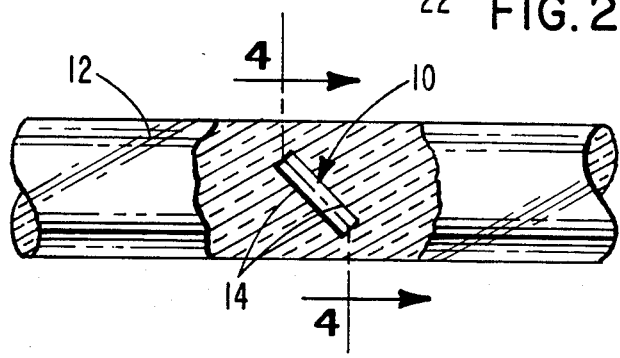
FIG. 3 is an enlarged view of an optical fiber and an intact, internal slot therein.

As shown in FIG. 2, the invention described and claimed herein includes an internal slot 10 inside an intact optical fiber 12. Slot 10 is formed in one embodiment by micromachining through one side of fiber 12 until the core is penetrated.

Figure 4:
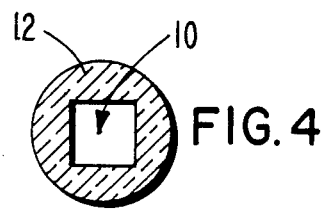
FIG. 4 is a view taken along line 4—4 of FIG. 3.
Figure 4A:
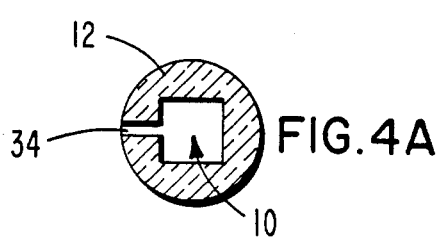
FIG. 4A is a view taken along line 4—4 of FIG. 3 wherein the internal slot is machined by an alternative process.

As shown in FIG. 4, the slot 10 may be micromachined using, for example, a finely focussed laser in which case only the central core of fiber 12 is machined. Alternatively, other micromachining techniques may be used, as explained below, in which case a narrow groove 34 may be formed in fiber 12 as shown in FIG. 4A, which provides access to the core of fiber 12 to allow slot 10 to be micromachined as desired. Slot 10 may be optically flat, or may be curved for focusing. The angle of the slot surfaces 14 with respect to the longitudinal axis of the fiber is approximately 45° but other angles may be used as appropriate for a particular application. At this angle, and as shown in FIG. 2, part of the beam in one fiber is internally reflected by the slot, as shown at 16, and part of the beam is transmitted, as shown at 18. The reflected beam 16 is then transmitted to an adjacent fiber, traveling through two fiber surfaces 20 and 22. The reflected beam 16 is then reflected again by the second slot 24 in the second fiber 26. The significant advantage of the invention described and claimed herein is that because a single intact fiber is used to transmit and direct light, the problem of carefully aligning two fiber ends is eliminated. Of course various configurations and networks of the optical fibers may be formed and schematic illustration of FIG. 2 is for descriptive purposes only.

Figure 5:
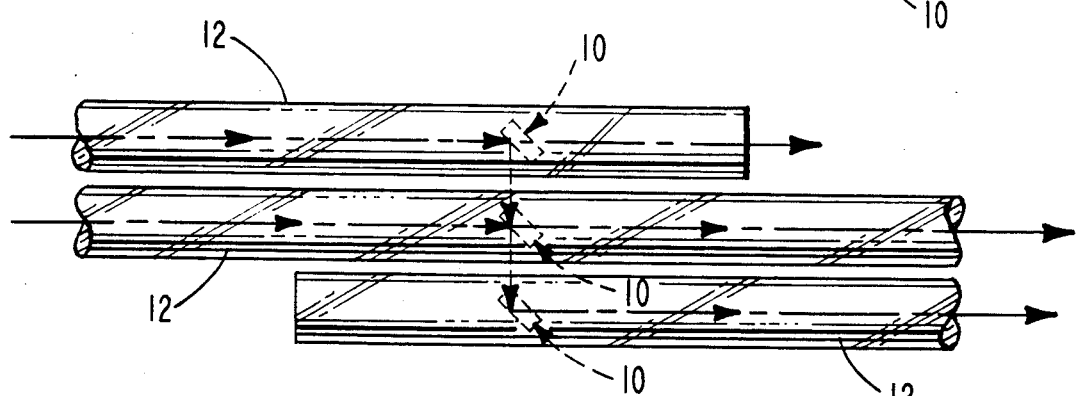
FIG. 5 is a schematic illustration of another configuration for directing light according to the invention.

As shown in FIG. 5, certainly more than two optical fibers may be used. FIG. 5 is a schematic illustration of a beamsplitter for a fiber Mach-Zender interferometer. It is, of course, straight forward to extent the invention for use in other beamsplitters and couplers as well.

Several techniques of micromachining have been developed to form narrow grooves or slots in conductors, semi-conductors and insulators, including silicon dioxide ($SiO_2$) from which most optical fibers are made. The micromachining techniques include both those based on physical processes, such as surface heating and sputtering, and those based on chemical processes, such as the formation of volatile compounds from surface material, as well as combinations of both types of processes. Direct contact and projection lithography, both photo lithography and X-ray lithography, lithography and direct writing and milling with electron, ion and laser beams, plasma etching, sputter etching, reactive sputter etching, reactive ion etching, laser-induced etching, and synergistic electron and X-ray lithography are all examples of micromachining processes which may be used to form the internal oriented slot 10 within intact optical fiber 12.

Chemical reactions, accelerated by charged particle or photon irradiation, is an example of one method of forming an internal slot in an optical fiber. For example, when an intense argon ion laser beam strikes a $Cl_2$ molecule, the molecule can be photo-dissociated into reactive Cl atoms which can then very quickly react with Si or $SiO_2$ surface atoms. The reaction is further enhanced if the surface is heated. Accordingly, when a focused laser beam is used in a $Cl_2$ atmosphere, only the parts of the surface of the Si or $SiO_2$ that are strongly illuminated are etched away. Very small holes and grooves, on the order of five micrometers, have been made this way. The etching rate is about 80 times slower in $SiO_2$ than in Si, but for other gases, such as $CF_4$ and $CHF_3$, the selectivity can be reversed. The surfaces produced by this etching method appear to be smooth with a surface roughness of approximately 1000 angstroms. This technique, for example, is very well-suited to the production of the internal slots in polarization-maintaining fibers. Finer resolution, however, can be obtained with reactive particle beam etching. Both of these techniques are well-known and used, for example, to etch circuitry on a microchip.

Presently attained etching rates and resolutions are quite acceptable for commercial fabrication of fiber optic beamsplitters and couplers according to the present invention. Plasma etching rates of $SiO_2$ in a plasma of $C_2F_6$, $CHF_3$, and He of 10,000 angstroms per minute with power densities of 10 watts per square centimeter have been achieved. Thus, it would take less than an hour to go the 50 micron radius of a typical polarization-maintaining single mode fiber. Comparable or even higher rates have been reported for laser enhanced surface chemistry. For example, 15 micron diameter holes have been "drilled" through a 250 micron wafer of Si in 35–45 seconds using an argon laser in $Cl_2$ and HCL atmospheres, with the etching rate in $SiO_2$ being some 80 times slower.

Submicron micromachining resolutions are desirable when coupling a wave across a slot. Known ion projection micro lithography has achieved the desired submicron resolution in a depth of focus greater than the 100 micron diameter of a typical single mode polarization-maintaining fiber. Micromachining can also be accomplished without raising the temperature to the point where stress relaxation and potential loss of polarization of the fibers can occur. For instance, temperatures can be kept from rising excessively with pulsed operation.

Since the most critical portion of the slot will be that area around the core of the fiber, that is within the order of five microns of a typical single mode fiber axis, it is not critical to have extremely carefully machined walls on the portions of the slots away from the core. This reduces the requirements on scattering and undercutting which are present in some of the micromachining techniques.

In addition to using micromachining techniques to form an internal, oriented, slot in an intact optical fiber, it is also possible to use ion implantation or radiation induced alteration to create oriented slots of different indices of refraction within optical waveguides for the purposes of beamsplitting and coupling. These "slots" differ from those created by micromachining in that the micromachining slots are defined by the absence of material whereas the "slots" formed by ion implantation are defined by a localized region of doping or ion-induced, or radiation-induced, damage or alteration. Like micromachining, which removes material to change the index of refraction within the optical fiber, ion implantation also changes the index of refraction and thus is equally effective in redirecting light within an intact optical fiber along a desired pathway.

With either a micromachined slot or a slot created by ion implantation, the optical fiber can be coated with a thin film of approximately several hundred angstroms thick of a conducting material. This film will be partially reflecting and would serve the purpose of partial redirection of the guided light. Using a thin conducting film in conjunction with the oriented, internal slot of an intact optical fiber, the slot angle is not as critical. However, using the conducting coating may not maintain polarity, if this is a desired objective.

Material can also be added to a micromachined slot to adjust the index of refraction of the slot. The degree of transmission and reflection can be adjusted in this way. Also, this makes possible the use of thicker slots.

Figure 6:
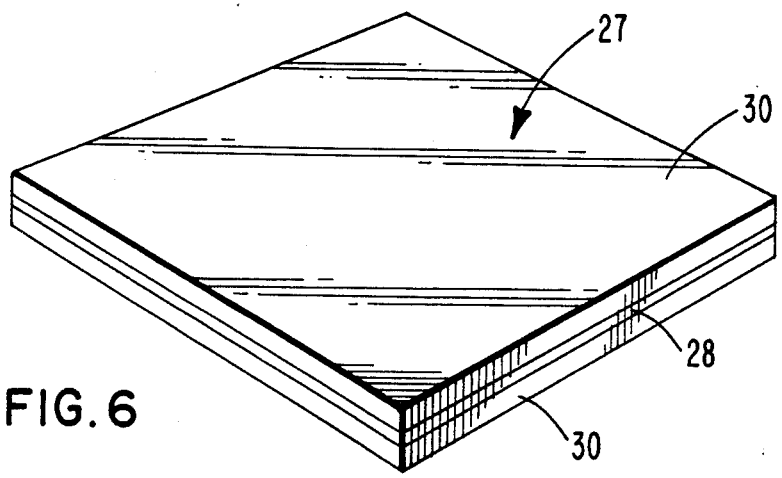
FIG. 6 is a two-dimensional optical waveguide structure prior to micromachining.
Figure 7:
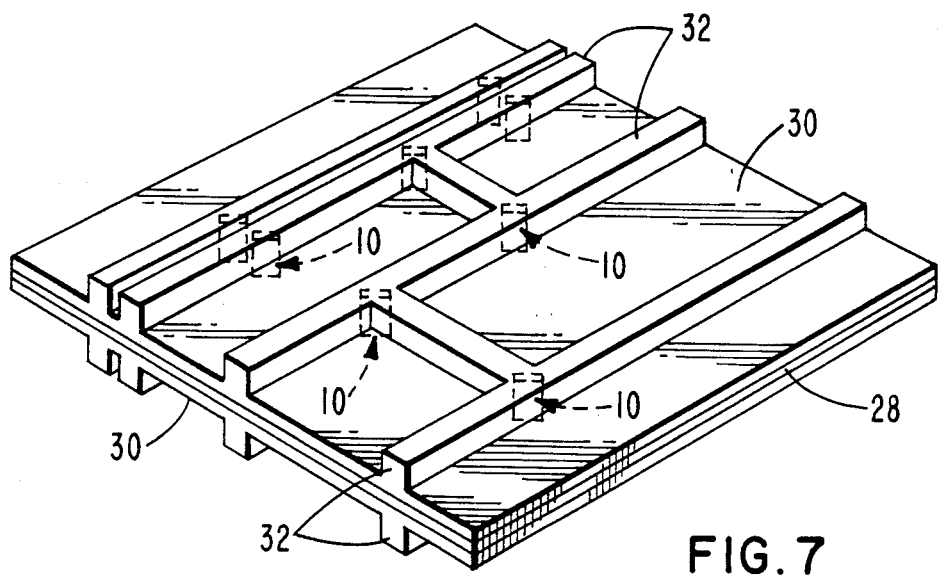
FIG. 7 is the waveguide of FIG. 6 transformed by micromachining into a network of coupled, one-dimensional waveguides.

The invention described and claimed herein can also be used to convert a two-dimensional optical guided wave structure into an array of selectively coupled linear waveguides. FIG. 6 shows a structure 27 comprising a refraction layer 28 sandwiched between materials 30 having indices of refraction different than the index of refraction of refraction layer 28. Although three layers are shown for the array of FIG. 6, it will be appreciated that this is for purposes of illustration only. Any number of refraction layers may be used as suitable for a particular application. If metal films are deposited at the interfaces, this structure can even be made selective to polarization with electric fields perpendicular to the sandwich planes. Micromachining or other techniques can now be used to selectively remove portions of one or more surfaces to define linear waveguides on the structure. Beamsplitting or coupling slots can then be formed in the remaining portions to create a circuit of coupled linear optical waveguides as shown in FIG. 7. Careful spacing and selection of light detectors and sources can be employed using the linear optical waveguides to set thresholds for detecting coupled signals. This would result in an optical network which could be switched independently of any local electrical signals, depending only on the light intensity levels introduced in the various channels. Additionally, some of the one-dimensional waveguide structures defined by the non-removed portions of the original structure 27, such as wave guide portions 32 shown in FIG. 7, can be made of varying width. This can be used to modify the shape of input optical pulses and to achieve, for example, pulse compression.

The invention described and claimed herein can be applied to multimode and non-polarization-maintaining fibers and waveguide structures as well as to single mode and polarization maintaining systems. If, for example, it is desired to transfer only a fraction of the light from a multimode fiber to another multimode fiber, a small slot could be cut into the first fiber and a larger slot into the second fiber so that the second could capture all of the light reflected by the first. A slot smaller than the fiber core reflects only a small fraction of the light passing through the fiber, whereas a larger slot captures a larger portion of light. Curved slots can also be used to provide focusing.

Although the invention has been described with respect to preferred embodiments, various modifications, especially with respect to size, shape, and positioning, will be apparent to those knowledgable in the art. The scope of the invention is limited only by the following claims.

I claim:

1. A method of making an optical waveguide beamsplitter/coupler in which orientation and width of an internal slot determines branching ratio comprising the steps of forming an internal oriented slot in an intact, cladded optical waveguide and using said slot to divide, combine, and direct light beams along desired paths.

2. The method recited in claim 1 wherein the step of forming an oriented slot comprises micromachining the optical waveguide.

3. The method recited in claim 2 wherein the step of micromachining comprises micromachining by a physical process.

4. The method recited in claim 2 wherein the step of micromachining comprises micromachining by a chemical process.

5. The method recited in claim 2 wherein the step of micromachining comprises micromachining by a combined physical and chemical process.

6. The method recited in claim 2 wherein the micromachining involves photon irradiation.

7. The method recited in claim 2 wherein the micromachining involves reactive particle beam etching.

8. The method recited in claim 2 wherein the micromachining involves photon beam etching.

9. The method recited in claim 2 wherein the micromachining involves lithography.

10. The method recited in claim 2 wherein the micromachining involves etching.

11. The method recited in claim 2 wherein the micromachining involves direct beam writing and milling.

12. The method recited in claim 1 wherein the step of forming an oriented slot comprises doping.

13. The method recited in claim 12 wherein the doping involves ion implantation to create an oriented slot having a different index of refraction than the other portions of the optical waveguide.

14. The method recited in claim 1 further comprising the step of coating the walls of said internal oriented slot with a conducting film approximately several hundred Angstroms thick.

15. The method recited in claim 1 further comprising the step of filling the slot with a material of different index of refraction from that of said waveguide.

16. An optical waveguide beamsplitter/coupler comprising:
an intact, cladded optical waveguide having a submicron, internal slot formed therein whereby said internal slot divides, combines and directs a light beam along desired paths, and whereby orientation and width of said slot determines the branching ratio of the optical waveguide beamsplitter/coupler.

17. An optical waveguide beamsplitter/coupler comprising:
at least one cladded intact fiber, said fiber having at least one submicron internal oriented slot formed therein whereby a light beam passing through said slot is redirected.

18. An optical waveguide beamsplitter/coupler as recited in claim 17 wherein said slot comprises a localized region of ion-induced alteration.

19. An optical waveguide beamsplitter/coupler as recited in claim 17 wherein said slot comprises a localized region of radiation-induced alteration.

20. An optical waveguide beamsplitter/coupler as recited in claim 17 wherein at least one of the walls of said internal oriented slot is coated with a conducting film approximately several hundred angstroms thick.

21. An optical waveguide beamsplitter/coupler as recited in claim 17 wherein said slot is filled with a material of different index of refraction from that of said fiber.

22. An optical waveguide beamsplitter/coupler as recited in claim 17 wherein said slot is curved for focusing.

23. An array of selectively coupled linear waveguides comprising a plurality of layers of material having different indexes of refraction;
   a plurality of intact linear waveguides formed in said layers; and
   a plurality of light directing submicron internal oriented slots formed in said intact linear waveguides whereby said waveguides are selectively coupled by said slots to create circuit paths.

24. An array of selectively coupled linear waveguides as recited in claim 23 wherein said linear waveguides are of varying widths to provide pulse shaping.

25. An array of selectively coupler linear wave guides as recited in claim 23 wherein said circuit paths are dependent on light intensity levels by varying the size and spacing of said light directing slots.

26. An array of selectively coupled linear waveguides as recited in claim 23 wherein metal films are deposited at the interfaces of said plurality of layers.

27. A polarization maintaining optical waveguide beamsplitter/coupler comprising:
   an intact optical waveguide having a submicron, polarization-maintaining internal slot formed therein whereby said internal slot divides, combines and directs a light beam along desired paths, and whereby orientation and width of said slot determines the branching ratio of the optical waveguide beamsplitter/coupler.

28. An optical waveguide beamsplitter/coupler comprising:
   at least one intake fiber, said fiber having at least one submicron, polarization-maintaining internal oriented slot formed therein whereby a light beam passing through said slot is redirected.

29. An array of selectively coupled, polarization-maintaining linear waveguides comprising a plurality of layers of material having different indexes of refraction;
   a plurality of intact linear waveguides formed in said layers; and
   a plurality of light directing submicron, polarization-maintaining, internal slots formed in said intact linear waveguides whereby said waveguides are selectively coupled by said slots to create circuit paths.

* * * * *